United States Patent [19]
Kadokura

[11] Patent Number: 5,186,802
[45] Date of Patent: Feb. 16, 1993

[54] ELECTRO-DEPOSITION COATED MEMBER AND PROCESS FOR PRODUCING IT

[75] Inventor: Susumu Kadokura, Sagamihara, Japan

[73] Assignee: Canon Kabushiki Kaisha, Tokyo, Japan

[21] Appl. No.: 673,073

[22] Filed: Mar. 21, 1991

[30] Foreign Application Priority Data

| Mar. 22, 1990 [JP] | Japan | 2-69817 |
| Mar. 22, 1990 [JP] | Japan | 2-69818 |
| Mar. 22, 1990 [JP] | Japan | 2-69819 |
| May 9, 1990 [JP] | Japan | 2-117498 |

[51] Int. Cl.$^5$ .................................. C25D 13/10
[52] U.S. Cl. .......................... 204/181.4; 204/181.1; 204/180.9
[58] Field of Search ............... 204/180.9, 181.1, 181.4

[56] References Cited

U.S. PATENT DOCUMENTS

| 4,382,981 | 5/1983 | Stoetzer et al. | 427/105 |
| 4,579,882 | 4/1986 | Kanbe et al. | 252/514 |
| 4,806,200 | 2/1989 | Larson et al. | 29/847 |
| 4,844,784 | 7/1989 | Suzuki et al. | 204/180.9 |

FOREIGN PATENT DOCUMENTS

| 1401301 | 4/1964 | France . |
| 59-223763 | 12/1984 | Japan . |
| 61-177399 | 8/1986 | Japan . |
| 61-276979 | 12/1986 | Japan . |

Primary Examiner—John Niebling
Assistant Examiner—Kishor Mayekar
Attorney, Agent, or Firm—Fitzpatrick, Cella, Harper & Scinto

[57] ABSTRACT

An electro-deposition coated member has a housing having on its surface a terraced portion or a vertically angular portion, or both of them. The housing is provided on at least one of a corner of the terraced portion and the vertically angular portion, with an exterior coating comprised of an electro-deposition coating film incorporated with conductive particles.

14 Claims, 4 Drawing Sheets

[5,186,802]

ELECTRO-DEPOSITION COATED MEMBER AND PROCESS FOR PRODUCING IT

BACKGROUND OF THE INVENTION

1. Field of the Invention

The present invention relates to an electro-deposition coated member. More particularly it relates to an electro-deposition coated member provided with an exterior coating comprising an electro-deposition coating film having electromagnetic wave shielding properties, that forms a housing used for optical instruments such as cameras, home electric appliances, office automation machinery, business machines, measuring devices or the like. It also relates to a process for producing such a member.

2. Related Background Art

In recent years, as electronic circuits have been made smaller size, increasingly complicated and precise, the misoperations and noise caused by electromagnetic waves generated from other component parts and circuits have presented significant problems. The electronic circuits themselves also generate electromagnetic waves, and also offer a significant problem by their influence on surroundings. In order to prevent these problems, it is sought to shield electronic circuits from invasion or radiation of electromagnetic waves.

As methods for shielding electromagnetic waves, a method is conventionally known in which a circuit substrate is surrounded with a metallic housing comprising a conductive material. However, as the products have been recently made small-sized and lightweight, it has been a prevailing practice to use a housing comprised of a plastic material. As a method of making such a plastic housing conductive, it has been a prevailing to use spray coating using a conductive coating composition. Other methods are also used which include zinc spray coating, electroless plating, vacuum deposition and conductive plastic coating.

The conventional methods, however, have the following disadvantages.

The conductive coating composition for spraying can achieve no sufficient electromagnetic wave shielding effect unless a conductive filler is contained in an amount of not less than 60 parts by weight and moreover a coating thickness is not less than 30 $\mu$m in the case of a copper filler and not less than 50 $\mu$m in the case of a nickel filler. For this reason, this coating composition is not suitable for decorative coating that provides an exterior coat on a housing.

In instances in which metal powder is used as the fillers, the metal powder has so large a specific gravity that it is required for the powder to be again dispersed when coating compositions are used, which, however, is not easy. To solve this problem, Japanese Patent Application Laid-open No. 59-223763 discloses a conductive coating composition for electromagnetic wave shielding in which Ni-coated mica powder is used as a conductive filler. This coating composition also can not achieve a sufficient electromagnetic wave shielding effect unless a coating is formed with a large thickness of 50 $\mu$m or more.

In addition, in housings with complicated shapes, the coating thickness tends to be non-uniform, often resulting in an insufficient shielding effect.

As for the zinc spray coating, it must give a coating thickness of as large as from 50 to 100 $\mu$m in order to ensure the shielding effect, and it also has a difficulty in adhesion to substrates. For this reason, it becomes necessary to provide steps for blast finishing, etc. In addition, there is still a problem in mass productivity because of a work environment worsened by zinc vapor gas.

In regard to the electroless plating, an electromagnetic wave shielding effect can be obtained when, for example, a copper coating is formed in a thickness of 1.0 $\mu$m to 1.5 $\mu$m or more. Since, however, the whole housing is plated, it becomes indispensable when used as a housing of a product, to form a coating film on the plated surface to improve the nice-looking appearance so that the commercial value can be enhanced. In doing so, however, there is a problem of the inadequacy in adhesion between the film surface formed by plating and the coating surface formed by coating. In particular, mere plating with copper may cause changes with time to bring about corrosion, resulting in a lowering of performances. Hence, the copper-plated surface must be subjected to nickel plating so that the quality can be prevented from being lowered. Moreover, since this nickel plating may greatly impair the adhesion to the coating film, the coating must be carried out using very limited materials such as special coating compositions as exemplified by Origiplate Z (available from Origin Electric Co., Ltd.). This greatly affect cost and can not be mass-productive.

On the other hand, a conductive plastic housing is known, which is formed of a mixture of a resin and a conductive filler such as metal powder with particle diameters of several tens $\mu$m or metal fiber. The resulting plastic housing, however, has a too seriously uneven surface to be usable as an exterior member if it is used in the state of a molded product which is untreated or unfinished. Thus, there is the problem that decorative coating must be applied in order to attain commercial value. In addition, because of poor conductivity, any secondary finishing becomes necessary for achieving perfect electromagnetic wave shielding, which can not be mass-productive. Moreover, since conductive plastic materials themselves are expensive, there is also a limit on its practical utilization.

As for exterior coatings of housings, there is an increasing trend towards a high-quality appearance, accompanied with a high desire for a satin-like appearance. Accordingly, it is customary to carry out blasting before coating and thereafter carry out exterior coating. When, however, a housing with a shape having a terrace or a vertical angle is coated, a difference in coating thickness is produced between a plane portion and a terraced portion or vertically angular portion to cause defects such as lack of hiding, so that no high-quality satin-like appearance can be obtained.

SUMMARY OF THE INVENTION

The present invention was made in order to overcome such disadvantages in the prior art. An object of the present invention is to provide an electro-deposition coated member which is a member that forms a housing, in particular, a member provided with an exterior coating in a uniform thickness, almost free of any difference in coating film thickness between a corner of a terraced portion, or a vertically angular portion, and a plane portion of the housing.

Another object of the present invention is to provide a process for producing an electro-deposition coated member having a high-quality satin-like appearance and also having superior electromagnetic wave shielding properties.

The electro-deposition coated member of the present invention comprises a housing having on its surface a terraced portion or a vertically angular portion, or both of them, said housing being provided on at least one of a corner of the terraced portion and the vertically angular portion, with an exterior coating comprised of an electro-deposition coating film incorporated with conductive particles.

The process of the present invention for producing an electro-deposition coated member is a process for producing an electro-deposition coated member comprising a housing having on its surface a terraced portion or a vertically angular portion, or both of them, said housing being provided on at least one of a corner of the terraced portion and the vertically angular portion, with an electro-deposition coating film incorporated with conductive particles;

said process comprising immersing said housing in an electro-deposition coating composition containing conductive particles to carry out electro-deposition coating to form on the surface of said housing an electro-deposition coating film having a surface roughness in a value of from 0.3 μm to 5 μm as the center line average roughness (Ra) and also capable of shielding electromagnetic waves.

The present inventors made various studies on electro-deposition coating films containing conductive particles. As a result, they have discovered that the particle diameter of conductive particles contained in an electro-deposition coating composition correlates with the surface roughness of the surface of an electro-deposition coated member with respect to a voltage applied at the time of electro-deposition. They have thus accomplished the present invention.

DESCRIPTION OF THE PREFERRED EMBODIMENTS

The present invention will be described below in detail.

The electro-deposition coated member of the present invention is a member that forms a housing having on its surface a terraced portion or a vertically angular portion, where a plane portion and a corner of the terraced portion, or the vertically angular portion, of the housing are provided with an electro-deposition coating film containing conductive particles, thus giving a member provided with an exterior coating in a uniform thickness, almost free from any difference in coating film thickness between the corner of the terraced portion, or the vertically angular portion, and the plane portion of the housing.

Figure 1:
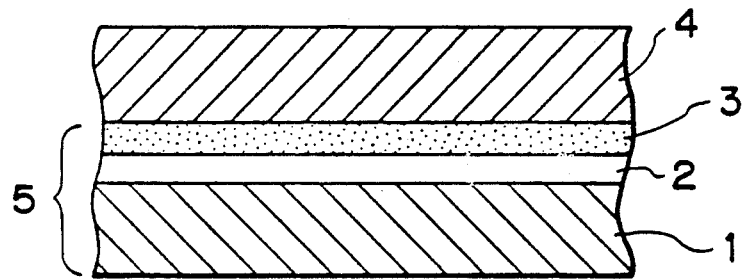
FIG. 1 is a schematic partial cross-section to show an example of the construction of the electro-deposition coated member of the present invention.

FIG. 1 is a schematic partial cross-section to show an example of the construction of the electro-deposition coated member of the present invention. The electro-deposition coated member of the present invention is a member that forms a housing having on its surface a terraced portion or a vertically angular portion. The corner of the terraced portion, or the vertically angular portion, is provided with an exterior coating in the manner as shown in FIG. 1, in which a non-metal member 1 is provided thereon with a coating layer or plating layer 2 such as a metal copper thin film and a chemically colored film 3 is provided on the coating layer 2 to form a substrate layer 5, and an electro-deposition coating film 4 containing conductive particles is provided on the chemically colored film 3.

Figure 2:
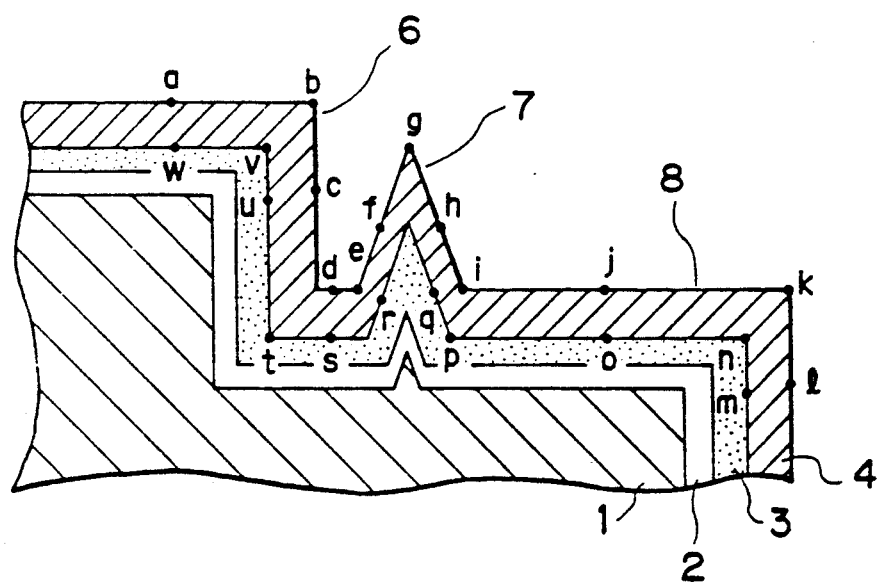
FIG. 2 is a schematic partial cross-section to show an example of housings comprised of the electro-deposition coated member of the present invention.

FIG. 2 is a schematic partial cross-section to show an example of housing comprised of the electro-deposition coated member of the present invention. As shown in the drawing, a plane portion 8, a corner 6 of a terraced portion and a vertically angular portion 7 of the housing are provided with an exterior coating comprised of the electro-deposition coating film containing conductive particles, where an exterior coating is formed in a uniform thickness, almost free from any difference in coating film thickness between the corner 6 of the terraced portion, or the vertically angular portion 7, and the plane portion 8 of the housing.

In the present invention, the chemically colored film 3 can be formed by surface treatment of the metal thin film 2 formed on the substrate. The chemically colored film is preferable because it can improve the adhesion to the electro-deposition coating film to be formed thereon. Although it is unclear why this chemically colored film gives a good adhesion to the electro-deposition coating film, it can be presumed that the surface of the chemically colored film has a large number of very fine pores and hence a physical adsorption can be produced at the interface with the electro-deposition coating film and also a chemical adsorption is produced between functional groups of a polymer in the electro-deposition coating film, active points on the surfaces of the conductive particles, and the chemically colored film, thus giving a greatly superior adhesion.

In the present invention, a chemically colored film formed by surface treatment of a copper thin film, for example, a film comprised of cupric oxide, cuprous oxide, copper carbonate, copper sulfide or ammonium copper hydroxide can give an excellent adhesion to the electro-deposition coating film. In particular, the cupric oxide can be preferably used in view of the adhesion of the electro-deposition coating film to the substrate, the corrosion resistance of the metal thin film 2 and the uniformity of the electro-deposition coating film. Thus, it is preferred in the present invention to use a copper thin film as the metal thin film 2. When a material other than copper is used as the metal substrate, it is preferred to apply copper plating to its surroundings.

Here, the metal thin film 2 is provided to form an electrode for the formation of the electro-deposition coating film and to form the chemically colored film on its surface. It may preferably have a film thickness of from 0.05 μm to 0.2 μm, and particularly from 0.1 μm to 0.15 μm. A film thickness larger than 0.2 μm is not preferred since it requires a long time for the formation of the copper thin film, resulting in an increase in the weight of the electro-deposition coated member and also a lowering of work efficiency.

The chemically colored film can be prepared in the following way: For example, the film comprised of cupric oxide can be formed, for example, by immersing a copper-plated substrate in a solution comprising a mixture of copper sulfide and potassium chlorate or a solution comprising a mixture of copper chloride, copper acetate and alum. The film comprised of copper sulfide can be formed, for example, by immersing the substrate in a solution comprising a mixture of potassium sulfide and ammonium chloride, or by immersing the substrate in a solution comprising a mixture of sodium hyposulfite and lead acetate. The film comprised of copper hydroxide can be formed, for example, by immersing the substrate in a solution comprising a mixture of copper nitrate, ammonium chloride and acetic acid. The film comprised of cuprous oxide, which is one of oxide films, can be formed, for example, by immersing the substrate in a solution comprising a mixture of copper sulfate and sodium chloride or a solution comprising a mixture of copper sulfate and ammonium chloride.

The conductive electro-deposition coating film 4 is comprised of conductive particles deposited together with a resin feasible for electro-deposition, in a high density on the chemically colored film. It has a conductivity even though it is a thin film, and functions as a coating film for electromagnetic wave shielding.

In the present invention, there are no particular limitations on the conductive particles to be deposited together with the resin to form the electro-deposition coating, so long as they can impart conductivity to the electro-deposition coating. They include, for example, a ceramic powder whose particle surfaces are coated with a metal (i.e., a metallized ceramic powder), a natural mica powder whose particles surfaces are coated with a metal (i.e., a metallized natural mica powder), an ultrafine metal powder having an average particle diameter of from 0.01 to 5 μm, a resin powder whose particles surfaces are coated with a metal, and a mixture of any of these. Of the above conductive particles, the metallized ceramic powder and the metallized natural mica powder are particularly preferred when the electro-deposition coating film is applied as a decorative coating film. This is because, when deposited together with the resin, they can facilitate complete curing of the electro-deposition coating at a low temperature of from 90° C. to 100° C., which is usually required to be 130° C. to 180° C. as a heating temperature when the coating is cured by heat treatment after completion of electro-deposition, so as to achieve firmer adhesion to the substrate.

Although it is unclear why these metallized ceramic powder and metallized natural mica powder, or a mixture thereof, have an excellent adhesion and can facilitate the low-temperature curing, it can be presumed that these powders are different from metal particles whose surfaces are susceptible to immediate oxidation, and can maintain the activity on the particle surfaces of the powder in a state stable to a certain extent by the mutual action between the particle surface and the metal coating, so that the active particle surfaces of the powder serve as cross-link points at the time of curing to accelerate the curing of the electro-deposition coating and also enable more formation of chemical bonds to the chemically colored film.

The metallized ceramic powder or metallized natural mica powder used in the present invention may include a ceramic powder or natural mica powder whose particle surfaces are coated with Cu, Ni, Ag, Au, Sn or the like. For the coating of the particle surfaces of these powders, Cu, Ag and Ni can be preferably used in view of the shielding performance and the cost. As a method for the coating of the powder particle surfaces, it is suitable to use electroless plating. A superior shielding performance and good coating film properties at the time of low-temperature curing can be obtained when the powder particle surfaces are coated in a coating thickness of from 0.05 μm to 3 μm, and particularly from 0.15 μm to 2 μm. Formation of coatings with a thickness of more than 3 μm makes the surface properties analogous to those of metal particles, so that the coatings are oxidized in the air because of their very active surfaces to bring about a decrease in the active points that contribute the cross-linking, tending to result in an insufficient curing of the electro-deposition coating at the time of low-temperature baking.

When Ni coatings are formed on the powder particles, the method as disclosed, for example, in Japanese Patent Application Laid-open No. 61-276979 can be used, according to which a water-based suspension of the powder is prepared, and then an aged solution for electroless nickel plating is added to the suspension to form nickel coatings on the power particle surfaces so that Ni coatings with a low phosphorus content, e.g., of 5% or less can be applied. Thus it is possible to form an electro-deposition coating having an improved conductivity and substantially the same shielding properties as in Cu-coated powder.

The ceramic powder and the natural mica powder may preferably have an average particle diameter of from 0.1 μm to 5 μm, particularly from 0.3 μm to 3 μm, and more preferably from 0.5 μm to 2 μm, taking account of the surface area contributory to its surface activity, the dispersibility in an electro-deposition coating composition, and a high-quality satin-like appearance of the coated member.

The ceramic used in the present invention may include, for example, aluminum oxide, titanium nitride, manganese nitride, tungsten nitride, tungsten carbide, lanthanum nitride, aluminum silicate, molybdenum disulfide, titanium oxide and silica. The natural mica may include phlogopite, serisite and muscovite.

As the conductive particles, in addition to the above, it is also possible to use, as previously described, an ultrafine metal powder having an average particle diameter of from 0.01 to 5 μm and a resin powder having an average particle diameter of from 0.1 to 5 μm whose particles surfaces are metallized. For example, the ultrafine metal powder may include powders of Ag, Co, Cu, Fe, Mn, Ni, Pd, Sn, Te, etc. obtained by heat plasma evaporation, which may preferably have an average particle diameter ranging from 0.01 μm to 5 μm, particularly from 0.01 μm to 0.1 μm, and more preferably from 0.03 μm to 0.07 μm. Powder with an average particle diameter of less than 0.01 μm may cause secondary agglomeration. On the other hand, powder with an average particle diameter more than 5 μm may result in sedimentation of particles in an electro-deposition coating composition, and also may give a metallic gloss to a coated member, bringing about a difficulty in forming a coating in the desired color.

The metallized resin powder also usable in the present invention can be obtained by forming Cu or Ni coatings in a thickness of from 0.05 μm to 3 μm as in the case of the ceramic powder, on powder particle surfaces of a resin including fluorine resins, polyethylene resins, acrylic resins, polystyrene resins and nylons. This resin powder may also preferably have an average particle diameter of from about 0.1 μm to about 5 μm.

Any of the conductive particles described above may be incorporated alone into the electro-deposition coating. It is thus possible to obtain an electro-deposition coated member with electromagnetic wave shielding properties and good coating film properties. When the ultrafine metal powder or the metallized resin powder, or a mixture of these, is added to the metallized ceramic powder or the metallized natural mica powder, or a mixture of these, in a weight proportion of the latter to the former of 1:0.2 to 3, the gaps between particles of the metallized ceramic powder and/or metallized natural mica powder in the electro-deposition coating are filled with particles of the ultrafine metal powder and/or metallized resin powder to increase contact areas between each powder, so that the shielding properties can be further improved and also an electro-deposition coated member having a superior coating film properties and a better adhesion to the substrate can be obtained even in the low-temperature heat treatment because of the action of the metallized ceramic powder and/or metallized natural mica powder.

In the present invention, any resins conventionally used in electro-deposition coating can be used as the resin feasible for electro-deposition, including, for example, in the case of an anionic electro-deposition coating composition, a resin having an anionic functional group such as a carboxyl group in order to impart negative charges and hydrophilicity which are necessary for the electro-deposition of the resin, specifically including acrylic melamine resins, acrylic resins, alkyd resins, maleinized polybutadiene and half esters or half amides of these. In the case of a cationic electro-deposition coating composition, the resin may include a resin having an cationic functional group such as an amino group in order to impart positive charges and hydrophilicity, specifically including epoxy resins, urethane resins, polyester resins and polyether resins. Of these resins, those having no self-crosslinking properties can be used in a mixture with a curing agent, for example, a melamine resin and a block polyisocyanate compound.

The content (herein "deposition quantity") of the conductive particles in the electro-deposition coating film of the present invention may preferably be in the range from 5% by weight to 50% by weight, particularly from 10% by weight to 30% by weight, and more preferably from 15% by weight to 25% by weight, in the electro-deposition coating film after curing. Such a content is preferred in order to attain an attenuation of, for example, 70 dB or more in the electromagnetic wave shielding performance and also taking account of the adhesion of the coating film as a decorative coating film to the substrate and the flexibility of the coating film. A content more than 50% by weight may bring about a brittle coating film, which is unsuitable as an exterior coating film. A content less than 5% by weight can give no sufficient shielding performance. The deposition quantity of the conductive particles can be measured by determination using an X-ray microanalyzer and by thermogravimetric analysis.

Thus, according to the present invention, the conductive particles are dispersed in the electro-deposition resin and deposited to form the electro-deposition coating film by the action of electrophoresis, so that a coating with a uniform coating thickness can be formed, which is almost free from any difference in coating film thickness between the corner of the terraced portion, or the vertically angular portion, and the plane portion of the housing. Further, the magnetic wave shielding properties can be imparted to the housing by the exterior coating film. Moreover, when the metallized ceramic powder or the metallized mica powder is incorporated as the conductive particles, the curing reaction can well proceed in spite of a low-temperature heat treatment (100° C.) and, in regard to coating film properties, it is possible to obtain the same properties as, or superior properties to, those of films formed by high-temperature curing.

The electro-deposition coating film may have a surface roughness of from 0.3 μm to 5 μm, preferably from 0.5 μm to 4.0 μm, and more preferably from 0.7 μm to 3.0 μm, as the center line average roughness (Ra). A surface roughness less than 0.3 μm may cause a problem in decorativeness, namely, a difficulty in obtaining the satin-like appearance. On the other hand, a surface roughness more than 5 μm undesirably tends to result in a lowering of commercial value required as exterior coatings and also a lowering of coating film properties.

A process for producing the electro-deposition coated member of the present invention, shown in FIG. 2, will be described below.

First, metallic coating is applied to the non-metal substrate, and the chemically colored film is further formed. There are no particular limitations on the non-metal substrate, and any plastic materials used in plastic housings for office automation machinery, home electric appliances, etc. can be used, which include, for example, ABS resins, polycarbonate resins, polyetherimide resins, glass fiber packed ABS resins and glass fiber packed polycarbonate resins.

As is carried out in the conventionally known coating on plastics, the non-metal substrate is subjected to etching and a catalytic treatment, e.g., a palladium treatment is carried out, followed by formation of the metal thin film.

The formation of the metal thin film on the above non-metal substrate may preferably be carried out by electroless plating or electrolytic plating.

Next, the chemically colored film is formed on the metal thin film. This chemically colored film can be formed by chemical treatment of the surface of the metal thin film.

More specifically, in the case when copper is used to form the metal thin film, a chemically colored film comprised of cupric oxide, copper carbonate, copper sulfide, ammonium copper hydroxide or cuprous oxide can be formed by a conventional method of treating a copper surface. For example, as previously described, when a cupric oxide film capable of giving an excellent adhesion of the electro-deposition coating film is used as the chemically colored film, it can be obtained by an alkali treatment, e.g., by immersing a substrate with a copper thin film in an aqueous solution of sodium hydroxide.

If the electro-deposition coating film is directly formed on the metal film formed of copper, the copper may dissolve into an electro-deposition coating composition and accumulate therein to adversely affect coating film properties. However, the copper can be prevented from dissolving when the electro-deposition coating is formed on the copper oxide film, the chemically colored film, so that no copper ions can be present in the electro-deposition coating composition.

Moreover, this chemically colored film should be formed as a thin film.

In the present invention, besides the non-metal substrates, a substrate made of a metal can also be used as the substrate. Materials therefor include, for example, copper, iron, nickel, zinc and tin. In such an instance, as shown in FIG. 2, the chemically colored film 3 can be formed by subjecting a substrate 5 to a direct surface treatment. In the case when a substrate made of a metal other than copper is used, its surface may be plated with copper followed by an oxidation treatment, so that the chemically colored film comprised of copper oxide can be obtained. This is a preferred embodiment in view of an improvement in adhesion to the electro-deposition coating film 4.

Next, the substrate having been provided with the chemically colored film is immersed in an electro-deposition coating composition to carry out electro-deposition, thereby forming an electro-deposition coating on the chemically colored film.

This electro-deposition process may be carried out according to a conventional method for electro-deposition coating. For example, setting the substrate side as the anode when the resin used in the electro-deposition is anionic, and setting the substrate side as the cathode when the resin is cationic, the electro-deposition may be carried out under conditions of a bath temperature ranging from 20° C. to 25° C., an applied voltage of from 50 V to 200 V, a current density of from 0.5 A/dm$^2$ to 3 A/dm$^2$, a treatment time ranging from 1 minute to 5 minutes to deposit together the resin and the conductive particles on the chemically colored film.

Here, the reason why the resin and the conductive particles are deposited together can be presumed as follows: In the resin feasible for electro-deposition, functional groups bonded to the resin are ionized in the electro-deposition coating composition. Hence, as a result of application of a DC voltage between an article to be coated and the opposing electrode, the resin is attracted toward the article and thus deposited. In the electro-deposition coating composition this resin is adsorbed around the conductive particles. Thus, with movement of the resin to the article to be coated, the conductive particles are also moved and thus deposited on the article together with the resin.

Next, the above substrate thus provided with an electro-deposition coating is washed with water and then heated to effect curing of the coating.

In the case when, for example, the metallized ceramic powder or the metallized natural mica powder, or a mixture of these, is used as the conductive particles, the above curing may be carried out in an oven at a low temperature of from 90° C. to 100° C. for 20 minutes to 180 minutes, so that sufficient curing can be effected. In the case when a usually available metal powder, the metallized resin powder or the ultrafine metal powder is used, the heating should be carried out at about 120° C. to about 180° C.

In this way, the electro-deposition coated member can be obtained to which the electromagnetic wave shielding properties have been imparted and at the same time an exterior coating has been applied.

In the present invention, taking account of the uniformity, adhesion and decorativeness of coating films, the electro-deposition coating film may preferably be formed as thinly as possible so long as the shielding properties can be ensured, and specifically may preferably be formed in a thickness of from 7 μm to 40 μm, and particularly from 10 μm to 25 μm.

Figure 3:
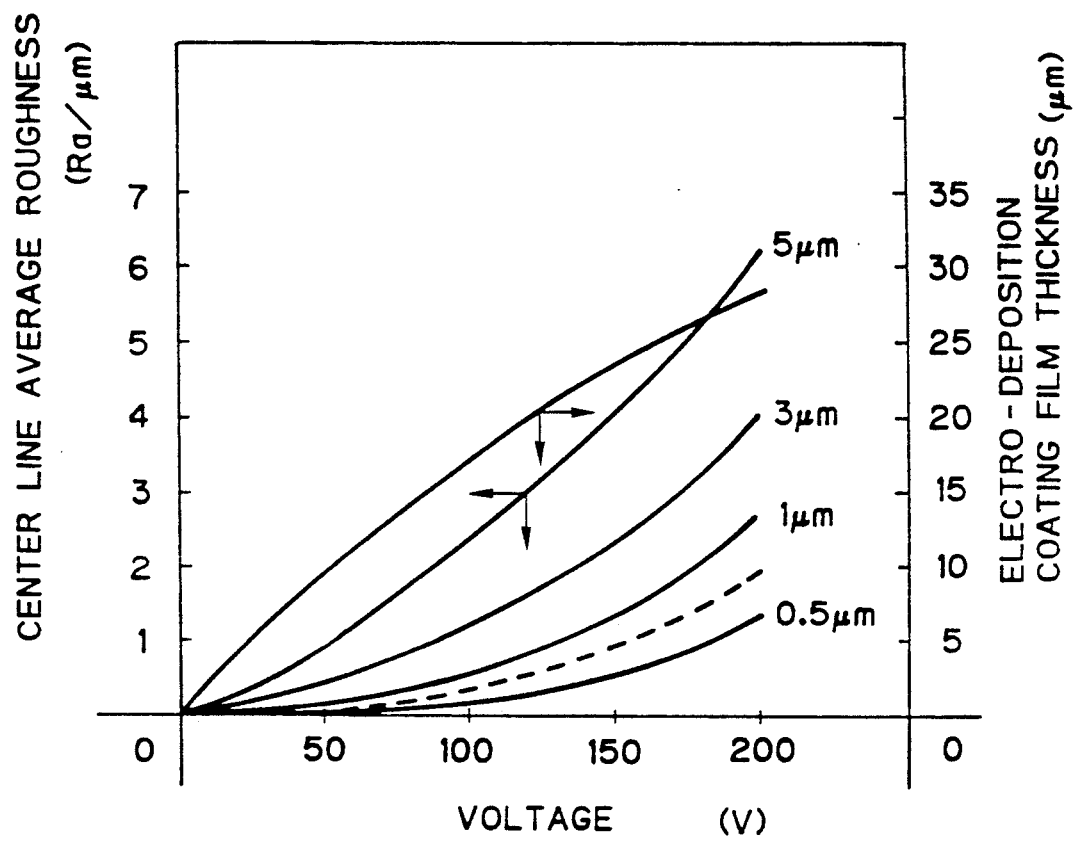
FIG. 3 is a graph to show the relationship between center line average roughness (Ra) of the surface of an electro-deposition coating film and applied voltage, and the relationship between electro-deposition coating film thickness and applied voltage, for each average particle diameter of metallized ceramic powder.

FIG. 3 shows the relationship between center line average roughness (Ra) of the surface of an electro-deposition coated member and applied voltage, and the relationship between electro-deposition coating film thickness and applied voltage, obtained when a housing with the substrate layer 5 formed thereon was immersed in an electro-deposition coating composition prepared by dispersing, in 100 parts by weight of an acrylic melamine resin (trade name: Honey Bright C-IL; produced by Honey Chemical Co.), 15 parts by weight of an alumina powder with an average particle diameter of 0.5 μm, 1 μm, 3 μm or 5 μm whose particle surfaces were coated with copper by electroless plating in a thickness of 0.1 μm and diluting the dispersion to 15% by weight as a concentration of solid contents, and electro-deposition was carried out for 3 minutes at an applied voltage of varied volts.

As is seen from FIG. 3, the surface roughness becomes greater with an increase in the applied voltage under the same average particle diameter. On the other hand, at this time the deposition quantity of the conductive particles in the electro-deposition coating film was about 25% by weight at a voltage of, for example, 100 V, without regard to the average particle diameter.

Figure 4:
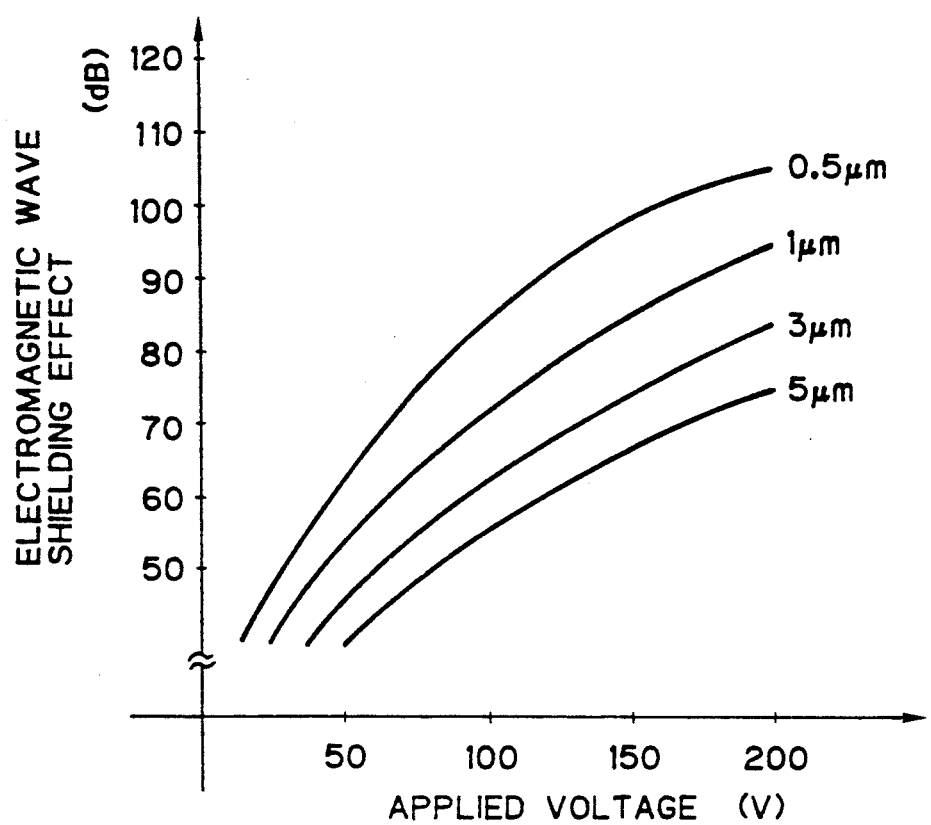
FIG. 4 is a graph to show the relationship between electromagnetic wave shielding performance and applied voltage for each average particle diameter, of an electro-deposition coated member having an electro-deposition coating film containing metallized ceramic powder.

FIG. 4 is a graph to show the relationship between a voltage and a mean value (dB) of attenuations against electromagnetic waves of 50 to 1,000 MHz, with respect to the average particle diameter (μm) of the conductive particles.

As is seen from FIG. 4, the shielding effect increases with an increase in the voltage. It is also seen that the shielding effect is in inverse proportion to the average particle diameter. This is presumably due to the fact that under the same voltage the deposition quantity in the electro-deposition coating film is constant without regard to the particle size and hence, with an increase in the average particle diameter, the relative number of the conductive particles in the electro-deposition coating film decreases and the contact areas between particles decrease.

The following is seen from the above-discussed FIGS. 3 and 4: When an electro-deposition coated member having, for example, a surface roughness Ra of 1 μm and a shielding performance of 70 dB is obtained, it is required, first in respect of the noted surface roughness, to apply a voltage of 40 V in the case of an average particle diameter of 5 μm, 77 V in the case of 3 μm, 125 V in the case of 1 μm and 200 V in the case of 0.5 μm as is seen from FIG. 3. On the other hand, in respect of the shielding performance of 70 dB or more, it is required to apply a voltage of 170 V or more in the case of an average particle diameter of 5 μm, 130 V or more in the case of 3 μm, 95 V or more in the case of 1 μm and 65 V or more in the case of 0.5 μm. Thus it is seen from these facts that a metallized ceramic powder with an average particle diameter of 0.5 μm may be used under application of a voltage of 200 V or a metallized ceramic powder with an average particle diameter of 1 μm may be used under application of a voltage of 125 V.

In an instance in which as the conductive particles an ultrafine metal powder with an average particle diameter of about 0.01 to 5 μm is used in addition to the metallized ceramic powder or metallized mica powder, the surface roughness of the electro-deposition coated member obtained is predominantly influenced by the powder with a larger average particle diameter and the deposition quantity thereof. For example, when electro-deposition is carried out for 3 minutes using an electro-deposition coating composition prepared by dispersing, in 100 parts by weight of an acrylic melamine resin, 8 parts by weight of an alumina powder with an average particle diameter of 1 μm whose particle surfaces are coated with copper in a thickness of 0.1 μm and 10 parts by weight of a copper powder with an average particle diameter of 0.03 μm and diluting the dispersion to 15% by weight as a concentration of solid contents, the Ra depends on the proportion of the metallized alumina powder held in the total deposition quantity in the electro-deposition coating film. In such an instance, the metallized alumina powder is deposited in a quantity of 10% by weight and an electro-deposition coated member having the surface roughness as shown in FIG. 3 by a dotted line can be obtained.

Figure 5:
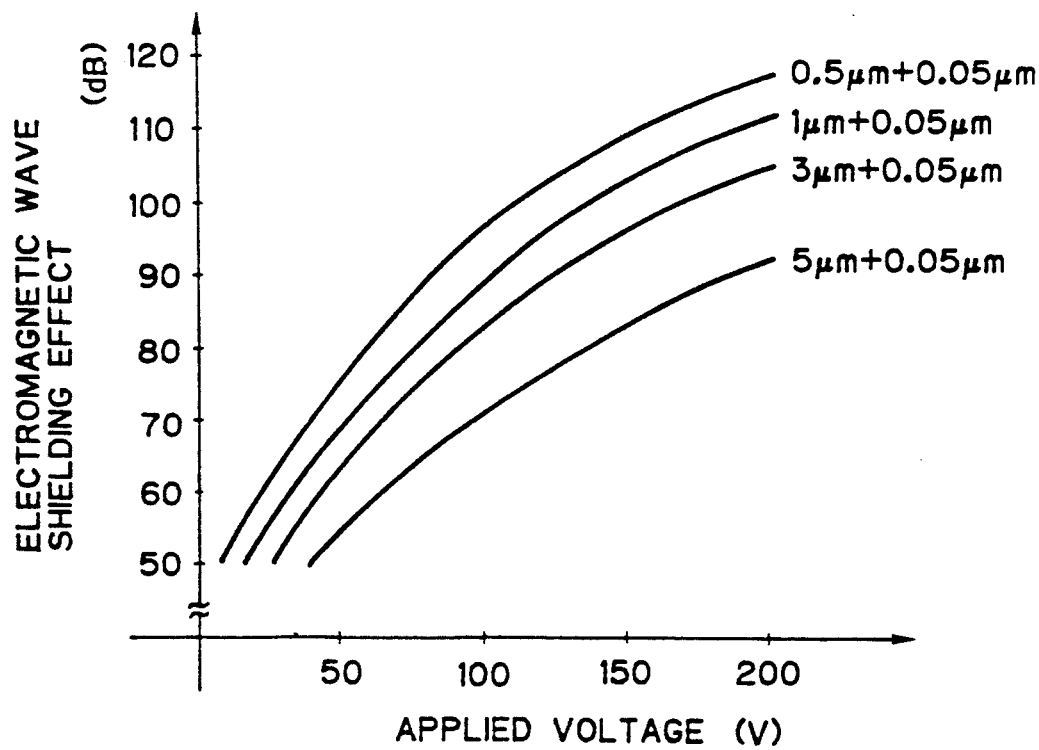
FIG. 5 is a graph to show the relationship between electromagnetic wave shielding performance and applied voltage for each average particle diameter, of an electro-deposition coated member having an electro-deposition coating film containing a mixed powder of metallized ceramic powder and ultrafine metal powder.

In the instance in which the mixed powder as described above is used, the shielding performance can be improved as previously stated. For example, when electro-deposition is carried out for 3 minutes using an electro-deposition coating composition prepared by dispersing, in 100 parts parts by weight of an acrylic melamine resin, 10 parts by weight of an alumina powder with an average particle diameter of 0.5 μm, 1 μm, 3 μm or 5 μm whose particle surfaces are coated with copper in a thickness of 0.1 μm and 15 parts by weight of a copper powder with an average particle diameter of 0.05 μm and diluting the dispersion to 15% by weight as a concentration of solid contents, to form an electro-deposition coated member having an electro-deposition coating film of 20 μm in coating thickness and 30% by weight in deposition quantity, the shielding performance is as shown in FIG. 5. It is seen therefrom that the shielding effect has been further improved than in the case shown in FIG. 4.

Thus, according to the present invention, the desired degree of satin finishing and the desired electromagnetic wave shielding performance can be achieved by varying the particle diameter of the conductive particles, the applied voltage and the content of the conductive particles in the electro-deposition coating composition.

Figure 6:
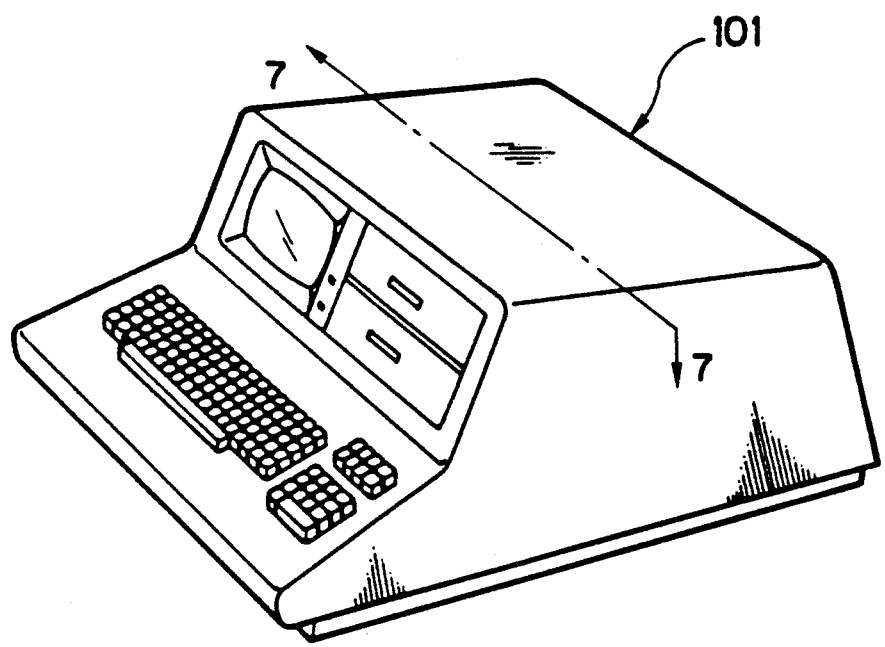
FIG. 6 is a perspective illustration of a computer in which the electro-deposition coated member of the present invention is used to form a housing.
Figure 7:
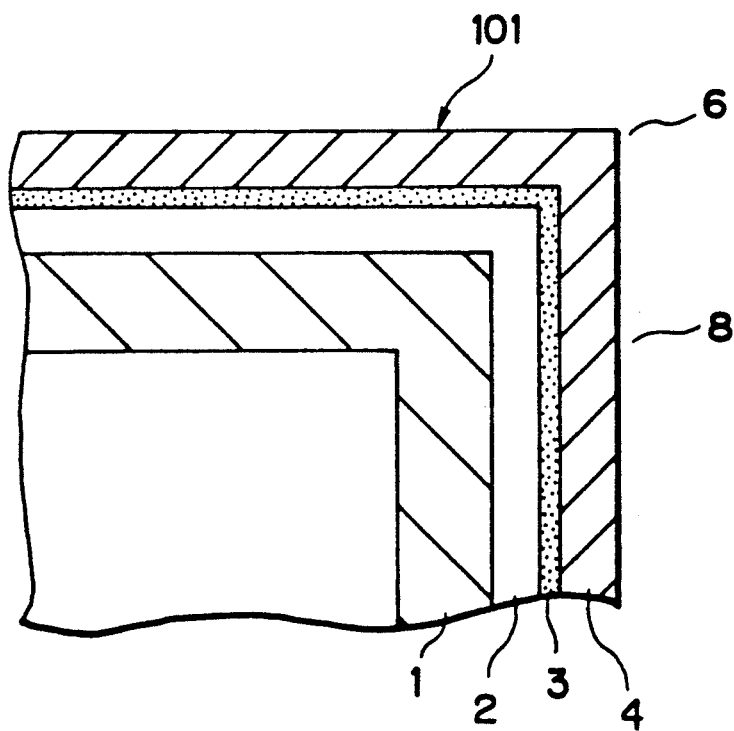
FIG. 7 is a partial cross-section of the housing of the computer shown in FIG. 6.

A decorative coating can be formed on the surface of a housing and also electromagnetic wave shielding properties can be imparted to the housing, when the present invention is used for exterior coating 102 of a housing 101 of, for example, the electronic machinery as shown in FIGS. 6 and 7.

As described above, according to the electro-deposition coated member of the present invention, the surface of the housing having on its surface a terraced portion or a vertically angular portion is provided with the electro-deposition coating film containing the conductive particles, and thus an exterior coating can be formed in a uniform thickness, almost free from any difference in coating film thickness between the corner of the terraced portion, or the vertically angular portion, and the plane portion of the housing, and also the surface of the housing can be finished in a uniformly satin-finished surface, bringing about a remarkable improvement in the decorative appearance. Thus, the present invention can make a great contribution to exterior coating and also to economical advantages.

Since the conductive particles are deposited to form the electro-deposition coating film, the electromagnetic wave shielding properties can be imparted to the electro-deposition coating film, and also the electromagnetic wave shielding and the exterior coating can be carried out in one step.

Moreover, according to the present invention, the electromagnetic wave shielding properties and the degree of satin finishing on the housing surface can be arbitrarily controlled by changing the content of the conductive particles in the electro-deposition coating, the particle diameter, the applied voltage and the electro-deposition time, so that it is possible to carry out the coating according to the purpose for which the housings to be coated are used.

The present invention will be described below in greater detail by giving Examples.

In the following Examples, the particle size of powder is measured with a centrifugal sedimentation particle size distribution measuring device (trade name: SACP-3; manufactured by Shimadzu Corporation). All powders are deemed to be comprised of dense spheres having the same particle diameters.

The identification of the conductive particles in the electro-deposition coating film is determined using an X-ray microanalyzer, and their content (deposition quantity) is analyzed using a thermogravimetric analyzer (trade name: Thermal Analysis System 7 series; manufactured by Perkin-Elmer Co.).

The electromagnetic wave shielding performance is measured according to the transmission line method (ASTM ES7-83 Method).

EXAMPLE 1-1

An ABS resin housing as shown in FIG. 2, having on its surface a terraced portion and a vertically angular portion, was treated with an etchant of a $CrO_3$—$H_2SO_4$—$H_2O$ system for 1 minute. After washing with water, the resulting substrate was treated at room temperature for 2 minutes using as a sensitizer solution a solution comprised of 30 g/lit. of stannous chloride and 20 ml/lit. of hydrochloric acid and washed with water. Subsequently, using as an activator solution a solution comprised of 0.3 g/lit. of palladium chloride and 3 ml/lit. of hydrochloric acid, the substrate was further treated at room temperature for 2 minutes to make its surface conductive. Thereafter, using an electroless copper plating solution (produced by Okuno Seiyaku Kogyo K.K.) of pH 13.0, plating was carried out at a bath temperature of 70° C. for 3 minutes to form a copper thin film of 0.2 μm thick. Subsequently, using an aqueous solution of 5% of sodium hydroxide and 1% of potassium persulfate, the surface of the copper thin film was treated at 70° C. for 30 seconds to form a cupric oxide film, the chemically colored film.

Then, in 100 parts by weight of an acrylic melamine resin (trade name: Honey Bright C-IL; produced by Honey Chemical Co.), 15 parts by weight of alumina with an average particle diameter of 1 μm whose particle surfaces were coated with nickel by electroless plating in a thickness of 0.2 μm was dispersed for 30 hours using a ball mill, and then the dispersion was diluted with desalted water to 15% by weight as a concentration of solid contents, followed by further addition of 2.0% by weight of carbon black for the purpose of coloring to make up a coating composition. Using this coating composition, electro-deposition was carried out at an applied voltage of 120 V for 3 minutes under conditions of a bath temperature of 25° C. and pH 8 to 9, setting the article to be coated as the anode and a 0.5 t stainless steel sheet as the opposing electrode. After the electro-deposition, the coated article was washed with water and then heated in an oven of 97° C.±1° C. for 60 minutes to effect curing. An electro-deposition coated member was thus obtained, having an electro-deposition coating film of 25 μm in coating thickness, containing 20% by weight (deposition quantity) of metallized alumina powder.

In respect of this electro-deposition coated member, the appearance of its coating film was visually evaluated and its coating film properties were measured, according to JIS K5980. Results obtained are shown in Tables 1-2 and 1-3. As shown in the tables, all the results surpassed JIS standards, showing that the electro-deposition coated member had superior appearance and coating film properties.

Thickness distribution of the electro-deposition coating film was also measured using a metallurgical microscope manufactured by Olympus Optical Co., Ltd., throughout the cross section of a to w shown in FIG. 2. Results obtained are shown in Table 1-1. As shown in the table, the coating film had been uniformly formed in a thickness within the range of from 24.7 μm to 26.0 μm at the terraced and vertically angular portions, where the coating thickness was almost the same as that of the plane portion 8.

The center line average roughness (Ra) of the surface of this electro-deposition coating film was 1.0 μm. The center line average roughness (Ra) of the surface was measured using Talysurf Type-6, manufactured by Rank Taylor Hobson Co.

Electromagnetic wave shielding performance against electromagnetic waves with frequencies of from 50 to 1,000 MHz was also measured according to the transmission line method to reveal that the attenuation was as good as about 80 dB.

As a result of this evaluation, the present invention was confirmed to be applicable to high-quality satin-like exterior coating and to electromagnetic wave shielding coating.

TABLE 1-1

| Thickness Distribution of Coating Film | | | | | | |
| --- | --- | --- | --- | --- | --- | --- |
| | a | b | c | d | e | f |
| Thickness: (μm) | 25 | 24.8 | 25 | 25 | 25 | 25 |
| | g | h | i | j | k | l |
| Thickness: (μm) | 24.7 | 24.8 | 25.1 | 25.2 | 24.8 | 25 |
| | m | n | o | p | q | r |
| Thickness: (μm) | 24.9 | 24.5 | 25.8 | 25 | 26.0 | 25 |

TABLE 1-1-continued

| Thickness Distribution of Coating Film | | | | | |
| --- | --- | --- | --- | --- | --- |
| | s | t | u | v | w |
| Thickness: (μm) | 25.2 | 24.5 | 25 | 24.8 | 26.0 |

EXAMPLE 1-2

The surface of the ABS resin housing as used in Example 1-1 was coated with copper by electroless plating in a thickness of 0.7 μm, followed by the same treatments as in Example 1-1 to give an electro-deposition coated member having an electro-deposition coating film of 20 μm in coating thickness, containing 20% by weight of metallized alumina powder.

In respect of this electro-deposition coated member, examination of its appearance and evaluation on coating film properties and electromagnetic wave shielding performance were made in the same manner as in Example 1-1.

EXAMPLE 1-3

The surface of the ABS resin housing as used in Example 1-1 was coated with copper by electroless plating in a thickness of 0.7 μm and subsequently coated with nickel by electroless plating in a thickness of 0.3 μm, followed by the same treatments as in Example 1-1 to give an electro-deposition coated member having an electro-deposition coating film of 20 μm in coating thickness, containing 20% by weight of metallized alumina powder.

In respect of this electro-deposition coated member, examination of its appearance and evaluation on coating film properties and electromagnetic wave shielding performance were made in the same manner as in Example 1-1.

COMPARATIVE EXAMPLE 1

Electro-deposition coating was carried out in the same manner as in Example 1-1 except that the metallized alumina powder used therein was not added.

The electro-deposition coated member thus obtained was evaluated in the same manner as in Example 1-1 to reveal that as to the electromagnetic wave shielding performance the attenuation was less than 50 dB. The appearance of the coating film and the coating film properties were as shown in Tables 1-2 and 1-3, showing that it was impossible to effect satin finishing of the housing surface and therefore the coating film was unsuitable as a satin-like decorative coating and an electromagnetic wave shielding coating.

COMPARATIVE EXAMPLE 2

To 50 g of an acrylic coating composition (No. 2026; produced by Kansai Paint Co., Ltd.), 50 g of the metallized alumina powder as used in Example 1-1 was added, which were gently mixed by the aid of a toluene solvent, followed by stirring for 10 minutes using a homomixer to give a spray coating composition.

Next, the ABS resing housing as used in Example 1-1 was spray-coated with the above spray coating composition to give a coated member having a spray coating film of 40 μm in dried coating thickness. This member was evaluated in the same manner as in Example 1-1 to reveal that the coating thickness at the terraced portion or vertically angular portion was not less than 5 μm smaller than that at the plane portion 8 and as for the electromagnetic wave shielding performance the attenuation was not more than 50 dB. The quality of appearance (uniformity, lack of hiding, stains, gloss unveness, runs, foreign matters, and degree of satin finishing), coating film properties (adhesion, moisture resistance, accelerated light-resistance, salt spray resistance, pencil hardness, alkali resistance, and solvent resistance) and electromagnetic wave shielding performance of the coating films of Examples 1-1 to 1-3 and Comparative Examples 1 and 2 were evaluated to obtain the results as shown in Tables 1-2 and 1-3.

TABLE 1-2

| | Quality of Appearance of Coating Films | | | | | | |
|---|---|---|---|---|---|---|---|
| | Uniformity | Lack of hiding | stains | Gloss unevenness | Runs | Foreign matters (dust) | Satin finishing |
| Example: | | | | | | | |
| 1 | AA | AA | AA | AA | AA | AA | AA |
| 2 | AA | AA | AA | AA | AA | AA | AA |
| 3 | AA | AA | AA | AA | AA | AA | AA |
| Comparative Example: | | | | | | | |
| 1 | AA | AA | AA | AA | AA | AA | C |
| 2 | C | B | AA | AA | B | B | C |

Notes:
Criterions of evaluation are as follows:

| | Uniformity | Lack of hiding, Stains, Gloss uneveness, Runs, Foreign matters | Satin finishing |
|---|---|---|---|
| AA: | Very good | Not observed at all | Very uniformly satin-finished |
| A: | Good | Little observed | Uniformly satin-finished |
| B: | A little poor | Observed in part | Not uniformly satin-finished |
| C: | Poor | Observed on the whole surface | Not satin-finished |

TABLE 1-3

| | Results of Evaluation on Coating Film Properties | | | | | | | |
|---|---|---|---|---|---|---|---|---|
| | (1) | Moisture resistance (500 hr) | Accelerated light resistance (600 hr) | *1 Salt spray resistance (500 hr) | (2) | (3) | Solvent resistance (MEK) | (4) |
| Example: | | | | | | | | |
| 1 | 10 | ΔE ≦1 NBS | ΔE ≦1 NBS | ≦0.5 mm | 3 H | RN 10 | X | A |
| 2 | 8 | ΔE 2 NBS | ΔE 2 NBS | 350 hr stop | 2 H | RN 8 | Y | AA |
| 3 | 2 | ΔE 3 NBS | ΔE 2 NBS | ≦4 mm | 2 H | RN 8 | Z | AA |
| Comparative Example: | | | | | | | | |
| 1 | 8 | ΔE 12 NBS | ΔE 5 NBS | ≦4 mm | 2 H | RN 6 | Z | D |
| 2 | 10 | ΔE ≦1 NBS | ΔE 1 NBS | ≦1 mm | 2 H | RN 10 | X | C |

(1): Adhesion (points)
*1 Salt spray resistance test: One-side blister at cut portions of films (mm)
(2): Pencil hardness
(3): Alkali resistance; RN: Rating number
X: No changes
Y: A little changed
Z: Peeled
(4): Electromagnetic wave shielding performance;
AA: Attenuation of not less than 90 dB
A: Attenuation of from 80 dB to less than 90 dB
B: Attenuation of from 75 dB to less than 80 dB
C: Attenuation of from 70 dB to less than 75 dB
D: Attenuation of not more than 50 dB

EXAMPLE 1-4

An ABS resin housing as shown in FIG. 2, having on its surface a terraced portion and a vertically angular portion, was treated with an etchant of a $CrO_3$—$H_2SO_4$—$H_2O$ system for 1 minute. After washing with water, the resulting substrate was treated at room temperature for 2 minutes using as a sensitizer solution a solution comprised of 30 g/lit. of stannous chloride and 20 ml/lit. of hydrochloric acid and washed with water. Subsequently, using as an activator solution a solution comprised of 0.3 g/lit. of palladium chloride and 3 ml/lit. of hydrochloric acid, the substrate was further treated at room temperature for 2 minutes to make its surface conductive. Thereafter, using an electroless copper plating solution (produced by Okuno Seiyaku Kogyo K.K.) of pH 13.0, plating was carried out at a bath temperature of 70° C. for 3 minutes to form a copper thin film of 0.2 μm thickness. Subsequently, using an aqueous solution of 5% of sodium hydroxide and 1% of potassium persulfate, the surface of the copper thin film was treated at 70° C. for 30 seconds to form a cupric oxide film, the chemically colored film.

Then, in 100 parts by weight of an acrylic melamine resin (trade name: Honey Bright C-IL; produced by Honey Chemical Co.), 15 parts by weight of silicon carbide with an average particle diameter of 1 μm whose particle surfaces were coated with copper by electroless plating in a thickness of 0.2 μm was dispersed for 30 hours using a ball mill, and then the dispersion was diluted with desalted water to 15% by weight as a concentration of solid contents, followed by further addition of 2.0% by weight of carbon black for the purpose of coloring to make up a coating composition. Using this coating composition, electro-deposition was carried out at an applied voltage of 150 V for 3 minutes under conditions of a bath temperature of 25° C. and pH 8 to 9, setting the article to be coated as the anode and a 0.5 t stainless steel sheet as the opposing electrode. After the electro-deposition, the coated article was washed with water and then heated in an oven of 97° C.±1° C. for 60 minutes to effect curing. An electro-deposition coated member was thus obtained, having an electro-deposition coating film of 25 μm in coating thickness, containing 30% by weight of metallized silicon carbide powder.

In respect of this electro-deposition coated member, the appearance of its coating film was evaluated and its coating film properties were measured, according to JIS K5980 as in Example 1-1. As a result, the same results as those in Example 1-1 were obtained.

Thickness distribution of the electro-deposition coating film was also measured in the same manner as in Example 1-1 to reveal that, like Example 1-1, the coating film had been uniformly formed at the terraced and vertically angular portions, where the coating thickness was almost the same as that of the plane portion 8.

The center line average roughness (Ra) of the surface of this electro-deposition coating film was 1.5 μm. Electromagnetic wave shielding performance was also measured in the same manner as in Example 1-1 to reveal that the attenuation was about 85 dB. As a result of this evaluation, the present invention was confirmed to be applicable to high-quality satin-like exterior coating and to electromagnetic wave shielding coating.

EXAMPLE 1-5

An ABS resin housing as shown in FIG. 2, having on its surface a terraced portion and a vertically angular portion, was treated with an etchant of a $CrO_3$—$H_2SO_4$—$H_2O$ system for 1 minute. After washing with water, the resulting substrate was treated at room temperature for 2 minutes using as a sensitizer solution a solution comprised of 30 g/lit. of stannous chloride and 20 ml/lit. of hydrochloric acid and washed with water. Subsequently, using as an activator solution a solution comprised of 0.3 g/lit. of palladium chloride and 3 ml/lit. of hydrochloric acid, the substrate was further treated at room temperature for 2 minutes to make its surface conductive. Thereafter, using an electroless copper plating solution (produced by Okuno Seiyaku Kogyo K.K.) of pH 13.0, plating was carried out at a bath temperature of 70° C. for 3 minutes to form a copper thin film of 0.2 μm thickness. Subsequently, using an aqueous solution of 5% of sodium hydroxide and 1% of potassium persulfate, the surface of the copper thin film was treated at 70° C. for 30 seconds to form a cupric oxide film, the chemically colored film.

Then, in 100 parts by weight of an acrylic melamine resin (trade name: Honey Bright C-IL; produced by Honey Chemical Co.), 15 parts by weight of alumina with an average particle diameter of 0.5 μm whose particle surfaces were coated with nickel by electroless plating in a thickness of 0.2 μm was dispersed for 30 hours using a ball mill, and then the dispersion was diluted with desalted water to 15% by weight as a concentration of solid contents, followed by further addition of 2.0% by weight of carbon black for the purpose of coloring to make up a coating composition. Using this coating composition, electro-deposition was carried out at an applied voltage of 120 V for 3 minutes under conditions of a bath temperature of 25° C. and pH 8 to 9, setting the article to be coated as the anode and a 0.5 t stainless steel sheet as the opposing electrode. After the electro-deposition, the coated article was washed with water and then heated in an oven of 97° C.±1° C. for 60 minutes to effect curing. An electro-deposition coated member was thus obtained, having an electro-deposition coating film of 20 μm in coating thickness, containing 22% by weight, as deposition quantity, of metallized alumina powder.

In respect of this electro-deposition coated member, the appearance of its coating film was evaluated and its coating film properties were measured, according to JIS K5980 as in Example 1-1. As a result, the same results as those in Example 1-1 were obtained, which were of the same level as, or a higher level than, that of a conventional high-temperature baked coating formed on a metal.

Thickness distribution of the electro-deposition coating film was also measured in the same manner as in Example 1-1 to reveal that, like Example 1-1, the coating film had been uniformly formed at the terraced and vertically angular portions, where the coating thickness was almost the same as that of the plane portion 8.

The center line average roughness (Ra) of the surface of this electro-deposition coating film was 0.5 μm. Electromagnetic wave shielding performance was also measured to reveal that the attenuation was about 88 dB. As a result of this evaluation, the present invention was confirmed to be applicable to exterior coating and to electromagnetic wave shielding coating.

EXAMPLE 1-6

An ABS resin housing having on its surface a terraced portion and a vertically angular portion, was treated with an etchant of a $CrO_3$—$H_2SO_4$—$H_2O$ system for 1 minute. After washing with water, the resulting substrate was treated at room temperature for 2 minutes using as a sensitizer solution a solution comprised of 30 g/lit. of stannous chloride and 20 ml/lit. of hydrochloric acid and washed with water. Subsequently, using as an activator solution a solution comprised of 0.3 g/lit. of palladium chloride and 3 ml/lit. of hydrochloric acid, the substrate was further treated at room temperature for 2 minutes to make its surface conductive. Thereafter, using an electroless copper plating solution (produced by Okuno Seiyaku Kogyo K.K.) of pH 13.0, plating was carried out at a bath temperature of 70° C. for 3 minutes to form a copper thin film of 0.2 μm thickness. Subsequently, using an aqueous solution of 5% of sodium hydroxide and 1% of potassium persulfate, the surface of the copper thin film was treated at 70° C. for 30 seconds to form a cupric oxide film, the chemically colored film.

Then, in 100 parts by weight of an acrylic melamine resin (trade name: Honey Bright C-IL; produced by Honey Chemical Co.), 15 parts by weight of silicon carbide with an average particle diameter of 5 μm whose particle surfaces were coated with copper by electroless plating in a thickness of 0.2 μm was dispersed for 30 hours using a ball mill, and then the dispersion was diluted with desalted water to 15% by weight as a concentration of solid contents, followed by further addition of 2.0% by weight of carbon black for the purpose of coloring to make up a coating composition. Using this coating composition, electro-deposition was carried out at an applied voltage of 170 V for 3 minutes under conditions of a bath temperature of 25° C. and pH 8 to 9, setting the article to be coated as the anode and a 0.5 t stainless steel sheet as the opposing electrode. After the electro-deposition, the coated article was washed with water and then heated in an oven of 97° C.±1° C. for 60 minutes to effect curing. An electro-deposition coated member was thus obtained, having an electro-deposition coating film of 28 μm in coating thickness, containing 35% by weight of metallized silicon carbide powder.

In respect of this electro-deposition coated member, the appearance of its coating film was evaluated and its coating film properties were measured, according to JIS K5980 as in Example 1-1. As a result, the same results as those in Example 1-1 were obtained, which were of the same level as, or a higher level than, that of a conventional high-temperature baked coating formed on a metal.

Thickness distribution of the electro-deposition coating film was also measured in the same manner as in Example 1-1 to reveal that, like Example 1-1, the coating film had been uniformly formed at the terraced and vertically angular portions, where the coating thickness was almost the same as that of the plane portion.

The center line average roughness (Ra) of the surface of this electro-deposition coating film was 5 μm. Electromagnetic wave shielding performance was also measured to reveal that the attenuation was about 70 dB. As a result of this evaluation, the present invention was confirmed to be applicable to exterior coating and to electromagnetic wave shielding coating.

EXAMPLE 2-1

An ABS resin housing as shown in FIG. 2, having on its surface a terraced portion and a vertically angular portion, was treated with an etchant of a $CrO_3$—$H_2SO_4$—$H_2O$ system for 1 minute. After washing with water, the resulting substrate was treated at room temperature for 2 minutes using as a sensitizer solution a solution comprised of 30 g/lit. of stannous chloride and 20 ml/lit. of hydrochloric acid and washed with water. Subsequently, using as an activator solution a solution comprised of 0.3 g/lit. of palladium chloride and 3 ml/lit. of hydrochloric acid, the substrate was further treated at room temperature for 2 minutes to make its surface conductive. Thereafter, using an electroless copper plating solution (produced by Okuno Seiyaku Kogyo K. K.) of pH 13.0, plating was carried out at a bath temperature of 70° C. for 3 minutes to form a copper thin film of 0.2 μm thickness. Subsequently, using an aqueous solution of 5% of sodium hydroxide and 1% of potassium persulfate, the surface of the copper thin film was treated at 70° C. for 30 seconds to form a cupric oxide film, the chemically colored film.

Then, in 100 parts by weight of an acrylic melamine resin (trade name: Honey Bright C-IL; produced by Honey Chemical Co.), 10 parts by weight of a copper powder with an average particle diameter of 0.03 μm and 8 parts by weight of alumina with an average particle diameter of 1 μm whose particle surfaces were coated with copper by electroless plating in a thickness of 0.2 μm were dispersed for 30 hours using a ball mill, and then the dispersion was diluted with desalted water to 15% by weight as a concentration of solid contents, followed by further addition of 2.0% by weight of carbon black for the purpose of coloring to make up a coating composition. Using this coating composition, electro-deposition was carried out at an applied voltage of 150 V for 3 minutes under conditions of a bath temperature of 25° C. and pH 8 to 9, setting the article to be coated as the anode and a 0.5 t stainless steel sheet as the opposing electrode. After the electro-deposition, the coated article was washed with water and then heated in an oven of 97° C.±1° C. for 60 minutes to effect curing. An electro-deposition coated member was thus obtained, having an electro-deposition coating film of 25 μm in coating thickness, containing 30% by weight of metallized alumina powder and copper powder.

In respect of this electro-deposition coated member, the appearance of its coating film was evaluated and its coating film properties were measured, according to JIS K5980. Results obtained are shown in Tables 2-1 and 2-2. As shown in the tables, all the results surpassed JIS standards, showing that the electro-deposition coated member had good appearance and superior coating film properties.

Thickness distribution of the electro-deposition coating film was also measured using a metallurgical microscope manufactured by Olympus Optical Co., Ltd., throughout the cross section of a to w shown in FIG. 2, in the same manner as in Example 1-1. As a result, scattering of the coating thickness was within ±4%.

The center line average roughness (Ra) of the surface of this electro-deposition coating film was 1.0 μm. Electromagnetic wave shielding performance was also measured in the same manner as in Example 1-1 to reveal that the attenuation was about 90 dB or more, which was evaluated as "AA". As a result of this evaluation, the present invention was confirmed to be applicable to exterior coating capable of providing a high-quality satin-like appearance and to electromagnetic wave shielding coating.

TABLE 2-1

| | Quality of Appearance of Coating Films | | | | | |
|---|---|---|---|---|---|---|
| Uniformity | Lack of hiding | stains | Gloss unevenness | Runs | Foreign matters (dust) | Satin finishing |
| Example: | | | | | | |
| 2-1 AA | AA | AA | AA | AA | AA | AA |

TABLE 2-2

| Results of Evaluation on Coating Film Properties | | | | | | |
|---|---|---|---|---|---|---|
| Moisture resistance (1) (500 hr) | Accelerated light resistance (600 hr) | Salt spray resistance (500 hr) | (2) | (3) | Solvent resistance (MEK) |
| Example: | | | | | | |
| 1 | 10 | ΔE ≦1 NBS | ΔE ≦1 NBS | ≦0.5 mm | 3 H | RN 10 | No changes |

(1): Adhesion (points);
(2): Pencil hardness
(3): Alkali resistance

EXAMPLE 2-2

An ABS resin housing as shown in FIG. 2, having on its surface a terraced portion and a vertically angular portion, was treated with an etchant of a $CrO_3$—$H_2SO_4$—$H_2O$ system for 1 minute. After washing with water, the resulting substrate was treated at room temperature for 2 minutes using as a sensitizer solution a solution comprised of 30 g/lit. of stannous chloride and 20 ml/lit. of hydrochloric acid and washed with water. Subsequently, using as an activator solution a solution comprised of 0.3 g/lit. of palladium chloride and 3 ml/lit. of hydrochloric acid, the substrate was further treated at room temperature for 2 minutes to make its surface conductive. Thereafter, using an electroless copper plating solution (produced by Okuno Seiyaku Kogyo K. K.) of pH 13.0, plating was carried out at a bath temperature of 70° C. for 3 minutes to form a copper thin film of 0.2 μm thickness. Subsequently, using an aqueous solution of 5% of sodium hydroxide and 1% of potassium persulfate, the surface of the copper thin film was treated at 70° C. for 30 seconds to form a cupric oxide film, the chemically colored film.

Then, in 100 parts by weight of an acrylic melamine resin (trade name: Honey Bright C-IL; produced by Honey Chemical Co.), 7 parts by weight of a copper powder with an average particle diameter of 0.05 μm and 8 parts by weight of silicon carbide with an average particle diameter of 1 μm whose particle surfaces were coated with copper by electroless plating in a thickness of 0.2 μm were dispersed for 30 hours using a ball mill, and then the dispersion was diluted with desalted water to 15% by weight as a concentration of solid contents, followed by further addition of 2.0% by weight of carbon black for the purpose of coloring to make up a coating composition. Using this coating composition, electro-deposition was carried out at an applied voltage of 120 V for 3 minutes under conditions of a bath temperature of 25° C. and pH 8 to 9, setting the article to be coated as the anode and a 0.5 t stainless steel sheet as the opposing electrode. After the electro-deposition, the coated article was washed with water and then heated in an oven of 97° C.±1° C. for 60 minutes to effect curing. An electro-deposition coated member was thus obtained, having an electro-deposition coating film of 20 μm in coating thickness, containing 20% by weight of the powder mixture.

In respect to this electro-deposition coated member, the appearance of its coating film was evaluated and its coating film properties were measured, according to JIS K5980 as in Example 1-1. As a result, the same results as those in Example 1-1 were obtained.

Thickness distribution of the electro-deposition coating film was also measured in the same manner as in Example 1-1 jto reveal that, like Example 2-1, the coating film had been uniformly formed at the terraced and vertically angular portions, where the coating thickness was almost the same as that of the plane portion 8.

The center line average roughness (Ra) of the surface of this electro-deposition coating film was 0.7 μm. Electromagnetic wave shielding performance was also measured to reveal that the attenuation was 90 dB or more. As a result of this evaluation, the present invention was confirmed to be applicable to exterior coating capable of providing high-quality satin-like appearance and to electromagnetic wave shielding coating.

EXAMPLE 2-3

An ABS resin housing as shown in FIG. 2, having on its surface a terraced portion and a vertically angular portion, was treated with an etchant of a $CrO_3$—$H_2SO_4$—$H_2O$ system for 1 minute. After washing with water, the resulting substrate was treated at room temperature for 2 minutes using as a sensitizer solution a solution comprised of 30 g/lit. of stannous chloride and 20 ml/lit. of hydrochloric acid and washed with water. Subsequently, using as an activator solution a solution comprised of 0.3 g/lit. of palladium chloride and 3 ml/lit. of hydrochloric acid, the substrate was further treated at room temperature for 2 minutes to make its surface conductive. Thereafter, using an electroless copper plating solution (produced by Okuno Seiyaku Kogyo K.K.) of pH 13.0, plating was carried out at a bath temperature of 70° C. for 3 minutes to form a copper thin film of 0.2 μm thickness. Subsequently, using an aqueous solution of 5% of sodium hydroxide and 1% of potassium persulfate, the surface of the copper thin film was treated at 70° C. for 30 seconds to form a cupric oxide film, the chemically colored film.

Then, in 100 parts by weight of an acrylic melamine resin (trade name: Honey Bright C-IL; produced by Honey Chemical Co.), 3 parts by weight of a silver powder with an average particle diameter of 0.07 μm and 7 parts by weight of alumina with an average particle diameter of 0.2 μm whose particle surfaces were coated with nickel by electroless plating in a thickness of 0.2 μm were dispersed for 30 hours using a ball mill, and then the dispersion was diluted with desalted water to 15% by weight as a concentration of solid contents, followed by further addition of 2.0% by weight of carbon black for the purpose of coloring to make up a coating composition. Using this coating composition, electro-deposition was carried out at an applied voltage of 120 V for 3 minutes under conditions of a bath temperature of 25° C. and pH 8 to 9, setting the article to be coated as the anode and a 0.5 t stainless steel sheet as the opposing electrode. After the electro-deposition, the coated article was washed with water and then heated in an oven of 97° C.±1° C. for 60 minutes to effect curing. An electro-deposition coated member was thus obtained, having an electro-deposition coating film of 20 μm in coating thickness, containing 30% by weight of the powder mixture.

In respect of this electro-deposition coated member, the appearance of its coating film was evaluated and its coating film properties were measured, according to JIS K5980 as in Example 1-1. As a result, the same results as those in Example 2-1 were obtained.

Thickness distribution of the electro-deposition coating film was also measured in the same manner as in Example 1-1 to reveal that, like Example 2-1, the coating film had been uniformly formed at the terraced and vertically angular portions, where the coating thickness was almost the same as that of the plane portion 8.

The center line average roughness (Ra) of the surface of this electro-deposition coating film was 0.3 μm. Electromagnetic wave shielding performance was also measured to reveal that the attenuation was 90 dB or more, which was evaluated as "AA". As a result of this evaluation, the present invention was confirmed to be applicable to exterior coating capable of providing fine satin-like appearance and to electromagnetic wave shielding coating.

EXAMPLE 2-4

An ABS resin housing as shown in FIG. 2, having on its surface a terraced portion and a vertically angular portion, was treated with an etchant of a $CrO_3$—$H_2SO_4$—$H_2O$ system for 1 minute. After washing with water, the resulting substrate was treated at room temperature for 2 minutes using as a sensitizer solution a solution comprised of 30 g/lit. of stannous chloride and 20 ml/lit. of hydrochloric acid and washed with water. Subsequently, using as an activator solution a solution comprised of 0.3 g/lit. of palladium chloride and 3 ml/lit. of hydrochloric acid, the substrate was further treated at room temperature for 2 minutes to make its surface conductive. Thereafter, using an electroless copper plating solution (produced by Okuno Seiyaku Kogyo K.K.) of pH 13.0, plating was carried out at a bath temperature of 70° C. for 3 minutes to form a copper thin film of 0.2 μm thickness. Subsequently, using an aqueous solution of 5% of sodium hydroxide and 1% of potassium persulfate, the surface of the copper thin film was treated at 70° C. for 30 seconds to form a cupric oxide film, the chemically colored film.

Then, in 100 parts by weight of an acrylic melamine resin (trade name: Honey Bright C-IL; produced by Honey Chemical Co.), 5 parts by weight of a nickel powder with an average particle diameter of 0.03 μm and 5 parts by weight of silicon carbide with an average particle diameter of 0.5 μm whose particle surfaces were coated with copper by electroless plating in a thickness of 0.2 μm were dispersed for 30 hours using a ball mill, and then the dispersion was diluted with desalted water to 15% by weight as a concentration of solid contents, followed by further addition of 2.0% by weight of carbon black for the purpose of coloring to make up a coating composition. Using this coating composition, electro-deposition was carried out at an applied voltage of 200 V for 3 minutes under conditions of a bath temperature of 25° C. and pH 8 to 9, setting the article to be coated as the anode and a 0.5 t stainless steel sheet as the opposing electrode. After the electro-deposition, the coated article was washed with water and then heated in an oven of 97° C.±1° C. for 60 minutes to effect curing. An electro-deposition coated member was thus obtained, having an electro-deposition coating film of 30 $\mu$m in coating thickness, containing 30% by weight of the powder mixture.

In respect of this electro-deposition coated member, the appearance of its coating film was evaluated and its coating film properties were measured, according to JIS K5980 as in Example 1-1. As a result, the same results as those in Example 2-1 were obtained.

Thickness distribution of the electro-deposition coating film was also measured in the same manner as in Example 1-1 to reveal that, like Example 2-1, the coating film had been uniformly formed at the terraced and vertically angular portions, where the coating thickness was almost the same as that of the plane portion 8.

The center line average roughness (Ra) of the surface of this electro-deposition coating film was 0.5 $\mu$m. Electromagnetic wave shielding performance was also evaluated in the same manner as in Example 3-1 to reveal that the attenuation was 100 dB or more. As a result of this evaluation, the present invention was confirmed to be applicable to exterior coating capable of providing satin-like appearance and to electromagnetic wave shielding coating.

EXAMPLE 3-1

An ABS resin housing as shown in FIG. 2, having on its surface a terraced portion and a vertically angular portion, was treated with an etchant of a $CrO_3$—$H_2SO_4$—$H_2O$ system for 1 minute. After washing with water, the resulting substrate was treated at room temperature for 2 minutes using as a sensitizer solution a solution comprised of 30 g/lit. of stannous chloride and 20 ml/lit. of hydrochloric acid and washed with water. Subsequently, using as an activator solution a solution comprised of 0.3 g/lit. of palladium chloride and 3 ml/lit. of hydrochloric acid, the substrate was further treated at room temperature for 2 minutes to make its surface conductive. Thereafter, using an electroless copper plating solution (produced by Okuno Seiyaku Kogyo K.K.) of pH 13.0, plating was carried out at a bath temperature of 70° C. for 3 minutes to form a copper thin film of 0.2 $\mu$m thickness. Subsequently, using an aqueous solution of 5% of sodium hydroxide and 1% of potassium persulfate, the surface of the copper thin film was treated at 70° C. for 30 seconds to form a cupric oxide film, the chemically colored film.

Then, in 100 parts by weight of an acrylic melamine resin (trade name: Honey Bright C-IL; produced by Honey Chemical Co.), 15 parts by weight of a natural mica powder with an average particle diameter of 2.0 $\mu$m whose particle surfaces were coated with copper by electroless plating in a thickness of 0.05 $\mu$m was dispersed for 30 hours using a ball mill, and then the dispersion was diluted with desalted water to 15% by weight as a concentration of solid contents, followed by further addition of 2.0% by weight of carbon black for the purpose of coloring to make up a coating composition.

Using this coating composition, electro-deposition was carried out at an applied voltage of 120 V for 3 minutes under conditions of a bath temperature of 25° C. and pH 8 to 9, setting the article to be coated as the anode and a 0.5 t stainless steel sheet as the opposing electrode. After the electro-deposition, the coated article was washed with water and then heated in an oven of 97° C.±1° C. for 60 minutes to effect curing. An electro-deposition coated member was thus obtained, having an electro-deposition coating film of 20 $\mu$m in coating thickness, containing 20% by weight of the powder mixture.

In respect to this electro-deposition coated member, the appearance of its coating film was evaluated and its coating film properties were measured, according to JIS K5980 as in Example 1-1. As a result, the results as shown in Tables 3-1 and 3-2 were obtained, which were of the same level as, or a higher level than, those in Example 1-1.

Thickness distribution of the electro-deposition coating film was also measured in the same manner as in Example 1-1 to reveal that scattering of the coating thickness was within ±4% and the coating film had been uniformly formed also at the terraced and vertically angular portions, where the coating thickness was almost the same as that of the plane portion 8.

The center line average roughness (Ra) of the surface of this electro-deposition coating film was 1.4 $\mu$m. As to the electromagnetic wave shielding performance, the attenuation was about 75 dB. From these results, the present invention was confirmed to be applicable to exterior coating capable of providing high-quality satin-like appearance and to electromagnetic wave shielding coating.

EXAMPLE 3-2

On an ABS resin housing as shown in FIG. 2, having on its surface a terraced portion and a vertically angular portion, a copper thin film and a cupric oxide film were formed in the same manner as in Example 4-1. As the electro-deposition coating composition, a coating composition was prepared in the following way: In 100 parts by weight of an acrylic melamine resin (trade name: Honey Bright C-IL; produced by Honey Chemical Co.), 5 parts by weight of a nickel powder with an average particle diameter of 0.03 $\mu$m and 10 parts by weight of a natural mica powder with an average particle diameter of 1.5 $\mu$m whose particle surfaces were coated with nickel by electroless plating in a thickness of 0.2 $\mu$m were dispersed for 30 hours using a ball mill, and then the dispersion was diluted with desalted water to 15% by weight as a concentration of solid contents, followed by further addition of 2.0% by weight of carbon black for the purpose of coloring. Using this coating composition, electro-deposition was carried out at an applied voltage of 150 V for 3 minutes under conditions of a bath temperature of 25° C. and pH 8 to 9, setting the article to be coated as the anode and a 0.5 t stainless steel sheet as the opposing electrode. After the electro-deposition, the coated article was washed with water and then heated in an oven of 97° C.±1° C. for 60 minutes to effect curing. An electro-deposition coated member was thus obtained, having an electro-deposition coating film of 24 $\mu$m in coating thickness, containing 28% by weight of the powder mixture.

In respect to this electro-deposition coated member, the appearance and coating film properties were evaluated in the same manner as in Example 1-1. Results obtained are shown in Tables 3-1 and 3-2.

Thickness distribution of the electro-deposition coating film was also measured in the same manner as in Example 1-1 to reveal that, like Example 3-1, the coating film had been uniformly formed at the terraced and vertically angular portions, where the coating thickness was almost the same as that of the plane portion 8.

The center line average roughness (Ra) of the surface of this electro-deposition coating film was 2 μm. Electromagnetic wave shielding performance was also measured to reveal that the attenuation was 100 dB or more. As a result of this evaluation, the present invention was confirmed to be applicable to exterior coating capable of providing high-quality satin-like appearance and to electromagnetic wave shielding coating.

EXAMPLE 3-3

An ABS resin housing as shown in FIG. 2, having on its surface a terraced portion and a vertically angular portion, was treated with an etchant of a $CrO_3$—$H_2SO_4$—$H_2O$ system for 1 minute. After washing with water, the resulting substrate was treated at room temperature for 2 minutes using as a sensitizer solution a solution comprised of 30 g/lit. of stannous chloride and 20 ml/lit. of hydrochloric acid and washed with water. Subsequently, using as an activator solution a solution comprised of 0.3 g/lit. of palladium chloride and 3 ml/lit. of hydrochloric acid, the substrate was further treated at room temperature for 2 minutes to make its surface conductive. Thereafter, using an electroless copper plating solution (produced by Okuno Seiyaku Kogyo K.K.) of pH 13.0, plating was carried out at a bath temperature of 70° C. for 3 minutes to form a copper thin film of 0.2 μm thickness. Subsequently, using an aqueous solution of 5% of sodium hydroxide and 1% of potassium persulfate, the surface of the copper thin film was treated at 70° C. for 30 seconds to form a cupric oxide film, the chemically colored film.

As an electro-deposition coating composition, a coating composition was prepared in the following way: In 100 parts by weight of an acrylic melamine resin (trade name: Honey Bright C-IL; produced by Honey Chemical Co.), 3 parts by weight of a silver powder with an average particle diameter of 0.07 μm, 7 parts by weight of alumina with an average particle diameter of 0.2 μm whose particle surfaces were coated with nickel by electroless plating in a thickness of 0.2 μm, and 10 parts by weight of a natural mica powder with an average particle diameter of 1.5 μm whose particle surfaces were coated with nickel by electroless plating in a thickness of 0.02 μm were dispersed for 30 hours using a ball mill, and then the dispersion was diluted with desalted water to 15% by weight as a concentration of solid contents, followed by further addition of 2.0% by weight of carbon black for the purpose of coloring. Using this coating composition, electro-deposition was carried out at an applied voltage of 100 V for 3 minutes under conditions of a bath temperature of 25° C. and pH 8 to 9, setting the article to be coated as the anode and a 0.5 t stainless steel sheet as the opposing electrode. After the electro-deposition, the coated article was washed with water and then heated in an oven of 97° C.±1° C. for 60 minutes to effect curing. An electro-deposition coated member was thus obtained, having an electro-deposition coating film of 16 μm in coating thickness, containing 15% by weight of the powder mixture.

In respect of this electro-deposition coated member, the appearance of its coating film was evaluated and its coating film properties were measured, according to JIS K5980 as in Example 1-1. Results obtained are shown in Tables 3-1 and 3-2.

Thickness distribution of the electro-deposition coating film was also measured in the same manner as in Example 1-1 to reveal that the coating film had been uniformly formed at the terraced and vertically angular portions, where the coating thickness was almost the same as that of the plane portion 8.

The center line average roughness (Ra) of the surface of this electro-deposition coating film was 0.8 μm. As to the electromagnetic wave shielding performance, the attenuation was about 90 dB. From these results, the present invention was confirmed to be applicable to exterior coating capable of providing high-quality satin-like appearance and to electromagnetic wave shielding coating.

EXAMPLE 3-4

An ABS resin housing as shown in FIG. 2, having on its surface a terraced portion and a vertically angular portion, was treated with an etchant of a $CrO_3$—$H_2SO_4$—$H_2O$ system for 1 minute. After washing with water, the resulting substrate was treated at room temperature for 2 minutes using as a sensitizer solution a solution comprised of 30 g/lit. of stannous chloride and 20 ml/lit. of hydrochloric acid and washed with water. Subsequently, using as an activator solution a solution comprised of 0.3 g/lit. of palladium chloride and 3 ml/lit. of hydrochloric acid, the substrate was further treated at room temperature for 2 minutes to make its surface conductive. Thereafter, using an electroless copper plating solution (produced by Okuno Seiyaku Kogyo K. K.) of pH 13.0, plating was carried out at a bath temperature of 70° C. for 3 minutes to form a copper thin film of 0.2 μm thickness. Subsequently, using a solution comprising a mixture of copper nitrate, ammonium chloride and acetic acid, the surface of the copper thin film was treated at 70° C. for 30 seconds to form a copper hydroxide film, the chemically colored film.

As an electro-deposition coating composition, a coating composition was prepared in the following way: In 100 parts by weight of an acrylic melamine resin (trade name: Honey Bright C-IL; produced by Honey Chemical Co.), 15 parts by weight of a silicon carbide with an average particle diameter of 0.5 μm whose particle surfaces were coated with copper by electroless plating in a thickness of 0.2 μm and 15 parts by weight of a natural mica powder with an average particle diameter of 3 μm whose particle surfaces were coated with copper by electroless plating in a thickness of 0.2 μm were dispersed for 30 hours using a ball mill, and then the dispersion was diluted with desalted water to 15% by weight as a concentration of solid contents, followed by further addition of 2.0% by weight of carbon black for the purpose of coloring. Using this coating composition, electro-deposition was carried out at an applied voltage of 170 V for 3 minutes under conditions of a bath temperature of 25° C. and pH 8 to 9, setting the article to be coated as the anode and a 0.5 t stainless steel sheet as the opposing electrode. After the electro-deposition, the coated article was washed with water and then heated in an oven of 97° C.±1° C. for 60 minutes to effect curing. An electro-deposition coated member was thus obtained, having an electro-deposition coating film of 27 μm in coating thickness, containing 35% by weight of the powder mixture.

In respect to this electro-deposition coated member, the appearance of its coating film was evaluated and its coating film properties were measured, according to JIS K5980 as in Example 1-1. Results obtained are shown in Tables 3-1 and 3-2, showing that the electro-deposition coated member had a good appearance and superior coating film properties.

Thickness distribution of the electro-deposition coating film was also measured in the same manner as in Example 1-1 to reveal that scattering of the coating thickness was within ±10% and the coating film had been uniformly formed at the terraced and vertically angular portions, where the coating thickness was almost the same as that of the plane portion 8.

The center line average roughness (Ra) of the surface of this electro-deposition coating film was 3 μm. As to the electromagnetic wave shielding performance, the attenuation was 100 dB.

TABLE 3-1

| | Quality of Appearance of Coating Films | | | | | | |
|---|---|---|---|---|---|---|---|
| | Uniformity | Lack of hiding | stains | Gloss unevenness | Runs | Foreign matters (dust) | Satin finishing |
| Example: | | | | | | | |
| 3-1 | AA | AA | AA | AA | AA | AA | AA |
| 3-2 | AA | AA | AA | AA | AA | AA | AA |
| 3-3 | AA | AA | AA | AA | AA | AA | AA |
| 3-4 | AA | AA | AA | AA | AA | AA | AA |

Notes:
Criterions of evaluation are as follows:
AA: Very good, or the same meaning as in Table 1-3.
A: Good, or the same meaning as in Table 1-3.

TABLE 3-2

| | Results of Evaluation on Coating Film Properties | | | | | |
|---|---|---|---|---|---|---|
| (1) | Moisture resistance (500 hr) | Accelerated light resistance (600 hr) | *1 Salt spray resistance (500 hr) | (2) | (3) | Solvent resistance (MEK) |
| Example 3-1: | | | | | | |
| 10 | $\Delta E \leq 1$ NBS | $\Delta E \leq 1$ NBS | ≤0.5 mm | 3 H | RN 10 | No changes |
| Example 3-2: | | | | | | |
| 10 | $\Delta E \leq 1$ NBS | $\Delta E \leq 1$ NBS | ≤0.5 mm | 2 H | RN 10 | No changes |
| Example 3-3: | | | | | | |
| 10 | $\Delta E \leq 1$ NBS | $\Delta E \leq 1$ NBS | ≤0.5 mm | 3 H | RN 10 | No changes |
| Example 3-4: | | | | | | |
| 10 | $\Delta E \leq 1$ NBS | $\Delta E \leq 1$ NBS | ≤0.5 mm | 3 H | RN 10 | No changes |

Notes:
(1): Adhesion (points)
*1 Salt spray resistance test: One-side blister at cut portions of films (mm)
(2): Pencil hardness
(3): Alkali resistance; RN: Rating number

EXAMPLE 4

An ABS resin housing as shown in FIG. 2, having on its surface a terraced portion and a vertically angular portion, was treated with an etchant of a $CrO_3$—$H_2SO_4$—$H_2O$ system for 1 minute. After washing with water, the resulting substrate was treated at room temperature for 2 minutes using as a sensitizer solution a solution comprised of 30 g/lit. of stannous chloride and 20 ml/lit. of hydrochloric acid and washed with water. Subsequently, using as an activator solution a solution comprised of 0.3 g/lit. of palladium chloride and 3 ml/lit. of hydrochloric acid, the substrate was further treated at room temperature for 2 minutes to make its surface conductive. Thereafter, using an electroless copper plating solution (produced by Okuno Seiyaku Kogyo K.K.) of pH 13.0, plating was carried out at a bath temperature of 70° C. for 3 minutes to form a copper thin film of 0.2 μm thickness. Subsequently, in a solution comprising a mixture of copper sulfate and sodium chloride, the surface of the copper thin film was treated at 70° C. for 30 seconds to form a cuprous oxide film, the chemically colored film.

Then, in 100 parts by weight of an acrylic melamine resin (trade name: Honey Bright C-IL; produced by Honey Chemical Co.), 15 parts by weight of a copper powder with an average particle diameter of 0.02 μm was dispersed for 30 hours using a ball mill, and then the dispersion was diluted with desalted water to 15% by weight as a concentration of solid contents, followed by further addition of 2.0% by weight of carbon black for the purpose of coloring to make up a coating composition. Using this coating composition, electro-deposition was carried out at an applied voltage of 200 V for 3 minutes under conditions of a bath temperature of 25° C. and pH 8 to 9, setting an article to be coated as the anode and a 0.5 t stainless steel sheet as the opposing electrode. After the electro-deposition, the coated article was washed with water and then heated in an oven of 145° C.±1° C. for 60 minutes to effect curing. An electro-deposition coated member was thus obtained, having an electro-deposition coating film of 27 μm in coating thickness, containing 38% by weight of the powder.

In respect to this electro-deposition coated member, the appearance of its coating film was evaluated and its coating film properties were measured, according to JIS K5980. Results obtained are shown in Tables 4-1 and 4-2.

Thickness distribution of the electro-deposition coating film was also measured using a metallurgical microscope manufactured by Olympus Optical Co., Ltd., throughout the cross section of a to w shown in FIG. 2. As a result, the coating film had been uniformly formed at the terraced and vertically angular portions, where the coating thickness was almost the same as that of the plane portion 8.

The center line average roughness (Ra) of the surface of this electro-deposition coating film was 0.3 μm. The center line average roughness (Ra) of the surface was measured using Talysurf Type-6, manufactured by Rank Taylor Hobson Co.

As to the electromagnetic wave shielding performance, the attenuation was about 70 dB.

TABLE 4-1

| | Quality of Appearance of Coating Films | | | | | | |
|---|---|---|---|---|---|---|---|
| | Uniformity | Lack of hiding | stains | Gloss unevenness | Runs | Foreign matters (dust) | Satin finishing |
| Example 4: | | | | | | | |
| | AA | AA | AA | AA | AA | AA | B |

TABLE 4-2

| | Results of Evaluation on Coating Film Properties | | | | | |
|---|---|---|---|---|---|---|
| (1) | Moisture resistance (500 hr) | Accelerated light resistance (600 hr) | *1 Salt spray resistance | (2) | (3) | Solvent resistance (MEK) |

TABLE 4-2-continued

Example 4:
| 8 | ΔE ≦1 NBS | ΔE ≦1 NBS | ≦0.5 mm | 1 H | RN 10 | No changes |

Notes:
(1): Adhesion (points)
*1 Salt spray resistance test: One-side blister at cut portions of films (mm)
(2): Pencil hardness
(3): Alkali resistance; RN: Rating number

I claim:

1. An electro-deposition coated member comprising a housing having on its surface a terraced portion or an angular portion, or both, said housing being provided on a corner of the terraced portion, on the angular portion, or both, with an exterior coating comprising an electro-deposition coating film incorporated with conductive particles, said conductive particles comprising at least one of a metallized ceramic powder and a metallized natural mica powder, and said electro-deposition coating film having a thickness from 7 μm to 40 μm.

2. An electro-deposition coated member according to claim 1, wherein said conductive particles comprise a mixture of i) at least one of a metallized ceramic powder and a metallized natural mica powder and ii) at least one of a metallized resin powder and an ultrafine metal powder.

3. An electro-deposition coated member according to claim 1, wherein said conductive particles comprise an ultrafine metal powder.

4. An electro-deposition coated member according to claim 1, wherein said housing comprises a housing of electronic machinery.

5. A process for producing an electro-deposition coated member comprising a housing having on its surface a terraced portion or an angular portion, or both, said housing being provided on a corner of the terraced portion or the angular portion, or both, with an electro-deposition coating film incorporated with conductive particles;
said process comprising the steps of:
immersing said housing in an electro-deposition coating composition containing conductive particles comprising at least one of metallized ceramic powder and a metallized natural mica powder
coating said housing with said electro-deposition coating composition, thereby forming on the surface of said housing an electro-deposition coating film having a surface roughness from 0.3 μm to 5 μm as the center line average roughness (Ra), a thickness from 7 μm to 40 μm, and used for shielding electromagnetic waves.

6. A process for producing an electro-deposition coated member according to claim 5, wherein said conductive particles comprise a mixture of i) at least one of a metallized ceramic powder and a metallized natural mica powder and ii) at least one of a metallized resin powder and an ultrafine metal powder.

7. A process for producing an electro-deposition coated member according to claim 5, wherein said conductive particles comprise an ultrafine metal powder.

8. A process for producing an electro-deposition coated member according to claim 5, wherein said housing comprises a housing of electronic machinery.

9. A process for producing an electro-deposition coated member according to claim 5, further comprising the step of heating a coating formed on said housing by said electro-deposition coating, to effect curing to form said electro-deposition coating film.

10. A process for producing an electro-deposition coated member according to claim 5, comprising the steps of subjecting the surface of a non-metal housing to metal plating to form thereon a metal coating, thereafter treating the surface of said metal coating to form a chemically colored film, and then forming said electro-deposition coating film on said chemically colored film.

11. A process for producing an electro-deposition coated member according to claim 10, wherein said metal coating is formed by copper plating.

12. A process for producing an electro-deposition coated member according to claim 10, wherein said chemically colored film comprises a film comprising an oxide of copper.

13. An electro-deposition coated member according to claim 1, wherein the content of said conductive particles in said electro-deposition coating film is 5-50 weight percent.

14. An electro-deposition coated member according to claim 13, wherein the content of said conductive particles in said electro-deposition coating film is 10-30 weight percent.

* * * * *

UNITED STATES PATENT AND TRADEMARK OFFICE
CERTIFICATE OF CORRECTION

PATENT NO. : 5,186,802
DATED : February 16, 1993
INVENTOR(S) : SUSUMU KADOKURA

It is certified that error appears in the above-identified patent and that said Letters Patent is hereby corrected as shown below:

COLUMN 2

Line 19, "performances." should read --performance.--.

COLUMN 5

Line 52, "particles" should read --particle--.

COLUMN 7

Line 8, "diameter" should read --diameter of--.

COLUMN 11

Line 39, "parts" (second occurrence) should be deleted.

COLUMN 14

Line 62, "resing" should read --resin--.

COLUMN 18

Line 53, "0.5 t" should read --0.5t--.

COLUMN 19

Line 53, "0.5 t" should read --0.5t--.

COLUMN 21

Line 25, "jto" should read --to--.

UNITED STATES PATENT AND TRADEMARK OFFICE
CERTIFICATE OF CORRECTION

PATENT NO. : 5,186,802
DATED : February 16, 1993
INVENTOR(S) : SUSUMU KADOKURA

It is certified that error appears in the above-identified patent and that said Letters Patent is hereby corrected as shown below:

COLUMN 29

Line 44, "powder" should read --powder, and--.

Signed and Sealed this

Twenty-sixth Day of April, 1994

Attest:

BRUCE LEHMAN

Attesting Officer   Commissioner of Patents and Trademarks